(12) United States Patent
Koers et al.

(10) Patent No.: US 8,268,189 B2
(45) Date of Patent: Sep. 18, 2012

(54) STORAGE-STABLE ACCELERATOR SOLUTION

(75) Inventors: Frederik Willem Karel Koers, Epse (NL); Anna Gerdine Van De Bovenkamp-Bouwman, Nijkerk (NL)

(73) Assignee: Akzo Nobel N.V., Arnhem (NL)

( * ) Notice: Subject to any disclaimer, the term of this patent is extended or adjusted under 35 U.S.C. 154(b) by 107 days.

(21) Appl. No.: 11/916,077

(22) PCT Filed: May 24, 2006

(86) PCT No.: PCT/EP2006/062563
§ 371 (c)(1),
(2), (4) Date: Jan. 7, 2008

(87) PCT Pub. No.: WO2006/128816
PCT Pub. Date: Dec. 7, 2006

(65) Prior Publication Data
US 2008/0207841 A1    Aug. 28, 2008

Related U.S. Application Data

(60) Provisional application No. 60/693,786, filed on Jun. 27, 2005.

(30) Foreign Application Priority Data

May 31, 2005  (EP) .................................... 05104682

(51) Int. Cl.
*C09K 3/00*  (2006.01)
(52) U.S. Cl. .................. 252/188.1; 252/186.1; 525/366; 525/370
(58) Field of Classification Search ................ 252/188.1; 525/366, 370
See application file for complete search history.

(56) References Cited

U.S. PATENT DOCUMENTS

| | | | | |
|---|---|---|---|---|
| 2,779,751 A | * | 1/1957 | Bredereck et al. ............... 526/94 |
| 3,307,972 A | * | 3/1967 | Ehrhardt ...................... 427/99.1 |
| 3,322,625 A | * | 5/1967 | Shimmin ......................... 424/45 |
| 3,424,706 A | * | 1/1969 | Smith et al. .................... 524/458 |
| 3,753,927 A | * | 8/1973 | Kracklauer .................... 502/155 |
| 3,830,876 A | | 8/1974 | Kracklauer |
| 3,959,547 A | * | 5/1976 | Polichette et al. ............. 428/209 |
| 4,009,150 A | | 2/1977 | Norling |
| 4,239,725 A | * | 12/1980 | Crivello ..................... 264/328.6 |
| 4,446,246 A | | 5/1984 | McGinniss |
| 4,933,157 A | * | 6/1990 | Counsell et al. ............. 424/1.45 |
| 4,944,125 A | | 7/1990 | Ito |
| 5,087,676 A | * | 2/1992 | Heider et al. ................... 526/93 |
| 5,235,010 A | | 8/1993 | Giovando |
| 5,616,645 A | * | 4/1997 | Kuwamura et al. ........... 524/546 |
| 5,962,068 A | * | 10/1999 | Tsuchiya et al. .............. 427/180 |
| 6,455,061 B2 | * | 9/2002 | Richardson et al. .......... 424/422 |
| 2001/0020078 A1 | * | 9/2001 | Tomihisa et al. ............. 526/264 |
| 2002/0099156 A1 | * | 7/2002 | Baxter et al. ................ 526/219.6 |
| 2006/0252899 A1 | * | 11/2006 | Himori et al. ............... 526/317.1 |

FOREIGN PATENT DOCUMENTS

| | | |
|---|---|---|
| EP | 0 094 160 | 7/1986 |
| EP | 1 211 263 | 10/2004 |
| WO | 03/102067 | 12/2003 |
| WO | 2005/047364 | 5/2005 |

OTHER PUBLICATIONS

International Search Report, PCT International Application No. PCT/EP2006/062563, dated Sep. 25, 2006.
F/77.1-2 Standard Method of Analysis, Polymer Chemicals Laboratory Deventer, Dec. 12, 1996; pp. 1-7.
Written Opinion of the International Searching Authority, International Application No. PCT/EP2006/062563, dated Sep. 25, 2006.
International Preliminary Report on Patentability, International Application No. PCT/EP2006/062563, dated Dec. 6, 2007.

\* cited by examiner

*Primary Examiner* — Tae H Yoon
(74) *Attorney, Agent, or Firm* — Robet C. Morriss; Kevin T. Godlewski

(57) ABSTRACT

Accelerator solution suitable for forming a redox system with peroxides and having a high storage stability, consisting essentially of (a) more than 1.0 wt % of one or more reducing agents, at least one of them being selected from ascorbic acid and sodium formaldehyde sulphoxylate, (b) one or more metal salts, at least one of them being selected from the group consisting of transition metal salts, lithium salts, and magnesium salts, (c) one or more organic oxygen-containing solvents, (d) optionally one or more stabilisers, and (e) optionally water.

17 Claims, No Drawings

STORAGE-STABLE ACCELERATOR SOLUTION

REFERENCE TO RELATED APPLICATION(S)

This application is a 371 National Phase of PCT/EP2006/062563 filed on May 24, 2006 which claims a Foreign Priority of EP 05104682.9 filed on May 31, 2005 and claims the benefit of U.S. Provisional Application No. 60/693,786 filed on Jun. 27, 2005.

The present invention relates to a storage-stable accelerator solution suitable for forming a redox system with peroxides. The invention further relates to a curing process employing this solution, and a polymerisation process using this solution, and cured or polymerised items obtainable by these processes.

Redox systems can be applied for resin curing and polymerisation initiation. Conventional redox systems comprise an oxidising agent (e.g. a peroxide), a soluble transition metal ion as accelerator, and a reducing agent. The accelerator serves to increase the activity of the oxidising agent at lower temperatures and, consequently, to speed up the polymerisation and the curing rate.

U.S. Pat. No. 4,009,150 discloses a time-lapse free-radical polymerisable composition comprising (i) a polymerisable compound selected from ethylenically unsaturated monomers and reactive polymers, (ii) a peroxide initiator, (iii) a soluble organic reducing agent, (iv) iron or copper chelate, and (v) excess chelating agent, wherein the chelating agent is selected from β-dicarbonyl compounds having an enol content of at least 4% and a dicarbonyl angle of not greater than 120° and β-hydroxy nitrogen-heterocyclic fused aromatics in which the hydroxyl group is attached to a carbon beta to the nitrogen in the adjacent ring.

This composition is said to be reactive at room temperature. The total composition therefore cannot be handled commercially as a preformed composition, but must be handled as a multipackage composition and not mixed together until it is ready for use.

EP 0 094 160 discloses a process for the polymerisation of vinyl chloride in aqueous suspension with an organo-soluble free-radical-yielding initiator by having a metal chelate complex present in the reaction zone and progressively adding a reducing agent.

Disclosed metal complexes are $Cu(dmgH)_2$, $Ni(EDTA)$, $Cu(bdm)_2$, $Ni(TETA)$, $Cu(TACTD)$, $Co(bipy)_3Cl_3$, and $Co(phen)_3Cl_3$.

EP 1 211 263 discloses a metal promoter complex consisting of at least one soluble metal salt and at least one chelating agent having less than 6 metal coordinating groups. In a polymerisation process, this metal promoter complex is added to a monomer mixture. Subsequently, oxidant and reductant are added to said monomer mixture in separate streams.

U.S. Pat. No. 4,446,246 discloses a method for curing a peroxide-curable ethylenically unsaturated compound using a peroxide initiator, a $Cu^+$ activator, and optionally a reducing agent.

WO 05/047364 discloses a pre-accelerated polyester resin or vinyl ester resin composition that is curable with liquid peroxide, containing an ascorbic acid compound and a soluble iron-containing complex. The composition is free of cobalt.

In all these prior art processes and compositions the peroxide, the reducing agent, and the metal salt accelerator are added to the monomer mixture or the curable resin as three separate streams. The reducing agent is not mixed with the metal salt prior to use, because this would result in reduction and precipitation of the metal.

It has now surprisingly been found that storage-stable accelerator solutions can be prepared which contain both the reducing agent and the accelerator metal salt.

The present invention relates to such an accelerator solution, which consists essentially of:
a) more than 1.0 wt % of one or more reducing agents, at least one of them being selected from ascorbic acid and sodium formaldehyde sulphoxylate,
b) one or more metal salts, at least one of them being selected from the group consisting of transition metal salts, lithium salts, and magnesium salts,
c) one or more organic oxygen-containing solvents,
d) optionally one or more stabilisers, and
e) optionally water.

The fact that the accelerator solution according to the present invention "consists essentially of" the indicated components, means that the solution does not contain any other compounds, except for trace amounts that have no material effect on the performance of the accelerator solution. In particular, it should be emphasized that the accelerator solution does not contain a polymeric resin.

Due to the presence of the oxygen-containing solvent, the accelerator solution has a storage stability of at least about 2 weeks. This means that after storage at 20° C. for at least 2 weeks, the accelerating activity—measured as the time to peak (TTP) in minutes—has decreased by no more than 10%. Preferably, also the peak exotherm, in ° C. (PE), has decreased by no more than 10%.

The peak exotherm is defined as the maximum temperature reached in a time-temperature curve measured at ambient temperature (20° C.), according to the method outlined by the Society of Plastic Institute, and available from Akzo Nobel Polymer Chemicals (standard method F/77.1). The time to peak is the time, in minutes, required to reach this maximum temperature. According to this method, 25 g of a mixture comprising 100 parts by weight of polyester resin, 2 parts by weight of peroxide, and 0.25 parts by weight of accelerator solution are poured into a test tube and a thermocouple is placed through the enclosure at the centre of the tube. The glass tube is then placed in an oil bath and maintained at a specific test temperature and the time-temperature curve is measured.

Preferably, the storage stability of the accelerator solution according to the invention is at least 4 weeks, more preferably at least 6 weeks, and most preferably at least 8 weeks.

Due to this storage stability, the solution containing both the metal salt accelerator and the reducing agent can be handled commercially in one single package. Further, with the use of this accelerator solution both the reducing agent and the metal salt accelerator can be added as one stream during curing and polymerisation initiation processes, which makes these processes simpler and more cost-efficient.

With the accelerator solution according to the invention, crystal clear end products may be produced. In addition, they can be made cobalt-free and colourless.

The accelerator solution according to the invention comprises one or more reducing agents, at least one of them being selected from ascorbic acid and sodium formaldehyde sulphoxylate (SFS). Ascorbic acid, which term in this specification includes L-ascorbic acid and D-isoascorbic acid, is the preferred reducing agent.

Examples of reducing agents which can be present in addition to ascorbic acid or SFS are reducing sugars like glucose and fructose, oxalic acid, phosphines, phosphites, organic or inorganic nitrites, organic or inorganic sulphites, organic or inorganic sulphides, mercaptanes, amines, and aldehydes. Also a mixture of ascorbic acid and SFS, optionally in combination with other reducing agents, may be used.

The reducing agent is present in the accelerator solution in an amount of more than 1.0 wt %, preferably at least 2 wt %, and most preferably at least 5%. It is preferably present in an amount of less than 30 wt %, more preferably less than 20 wt %, all based on the total weight of the accelerator solution. The term "more than 1.0 wt %" does not include the value 1.0 wt %.

The accelerator solution further contains one or more metal salts, at least one of them being selected from the group consisting of transition metal salts, lithium salts, and magnesium salts. Preferred metal salts are copper, cobalt, iron, nickel, tin, manganese, vanadium, lithium, and magnesium salts. More preferred metal salts are copper, cobalt, iron, and vanadium salts. Due to the toxicity of cobalt and vanadium, copper and iron salts are the most preferred metal salts.

Combinations of metal salts—e.g. vanadium and copper salts, vanadium and iron salts—can also be used.

The salt employed preferably is a halide, nitrate, sulphate, lactate, 2-ethyl hexanoate, acetate, proprionate, butyrate, oxalate laurate, oleate, linoleate, palmitate, stearate, acetyl acetonate, or naphthenate. More preferred salts are halides, nitrates, sulphates, lactates, 2-ethyl hexanoates, and acetates. Examples of such salts are Cu(II) acetate, Cu(II) sulphate, Cu(II) 2-ethyl hexanoate, Co(II) acetate, Fe(II) sulphate, Fe(III) chloride, V(II) 2-ethyl hexanoate, and combinations thereof.

The metal salt(s) is/are present in the accelerator solution in a preferred total amount of at least 0.01 wt %, more preferably at least 0.1 wt %. The metal salt(s) is/are preferably present in a total amount of less than 10 wt %, more preferably less than 5 wt %, and most preferably less than 2 wt %, calculated as salt(s) and based on the total weight of the accelerator solution.

The organic oxygen-containing solvent is a solvent comprising at least one oxygen atom and capable of forming a complex with the metal present in the accelerator solution. The solvent preferably has a melting point of 0° C. or less. In general, the solvent will carry an aldehyde, ketone, ether, ester, alcohol, phosphate, or carboxylic acid group.

Examples of suitable solvents are glycols such as ethylene glycol, glycerol, diethylene glycol, dipropylene glycol, and polyethylene glycol; isobutanol; pentanol; 1,2-dioximes, N-methylpyrrolidinone, N-ethyl pyrrolidinone; phosphorus-containing compounds such as diethyl phosphate, dibutyl phosphate, tributyl phosphate, triethyl phosphate, dibutyl phosphite, and triethyl phosphite; esters such as dibutyl maleate, dibutyl succinate, ethyl acetate, butyl acetate, methyl acetoacetate, ethyl acetoacetate, mono- and diesters of ketoglutaric acid, pyruvates, and esters of ascorbic acid such as ascorbic palmitate; 1,3-diketones and aldehydes, in particular acetyl acetone, benzoyl acetone, and dibenzoyl methane; mono- and diesters, more in particular diethyl malonate and succinates; 1,2-diketones, in particular diacetyl and glyoxal; butyl dioxytol (also known as diethylene glycol monobutyl ether, formula $nBuOCH_2CH_2OCH_2CH_2OH$), benzyl alcohol, and fatty alcohols. Preferred solvents are triethyl phosphate, dibutyl phosphate, ethylene glycol, diethylene glycol, polyethylene glycol, N-methylpyrrolidone, ethyl acetate, and butyl acetate.

A mixture of two or more of the aforementioned solvents may also be used.

The accelerator solution preferably comprises at least 50 wt %, more preferably at least 70 wt %, and preferably less than 95 wt %, more preferably less than 90 wt % of solvent, all based on the total weight of the accelerator solution.

A stabiliser may be present in the accelerator solution according to the invention. Suitable stabilisers are compounds that typically prevent crystallisation of the metal salt(s) in the solution, for example tertiary amines such as triethyl amine, triethanol amine, and dimethylamino ethanol; polyamines such as 1,2-(dimethyl amine)ethane; secondary amines such as diethanol amine (DETA) and diethyl amine; monoethanol amine; nicotinamide; diethyl acetoacetamide; itaconic acid; monobutyl dihydrophosphite; and alkali metal 2-ethyl hexanoates such as lithium 2-ethyl hexanoate, potassium 2-ethyl hexanoate, sodium 2-ethyl hexanoate, barium 2-ethyl hexanoate, and cesium 2-ethyl hexanoate.

The stabilisers may be added to the accelerator solution as such, or they may be formed in situ. For example, alkali metal 2-ethyl hexanoates can be prepared in situ in the accelerator solution, after addition of the alkali metal hydroxide and 2-ethyl hexanoic acid to the solution.

If one or more stabiliser(s) is/are present in the accelerator solution, their amount preferably is at least 0.01 wt %, more preferably at least 0.1 wt %, and preferably not more than 20 wt %, more preferably not more than 10 wt %, all based on the total weight of the accelerator solution.

The accelerator solution according to the present invention may optionally comprise water. If present, the water content of the solution preferably is at least 0.01 wt % and more preferably at least 0.1 wt %. The water content is preferably not more than 50 wt %, more preferably not more than 40 wt %, more preferably not more than 20 wt %, even more preferably not more than 10 wt %, and most preferably not more than 5 wt %, all based on the total weight of the accelerator solution.

The accelerator solution according to the present invention can be prepared by simply mixing the ingredients, optionally with intermediate heating and/or mixing steps. There is no specific order of addition which has to be applied. For example, first the one or more stabilisers may be added to the one or more solvents, after which the metal salt(s) is/are added, followed by the reducing agent(s). Another option is the addition of the one or more stabilisers to the one or more solvents, after which the reducing agent(s) is/are added, followed by the metal salt(s). Or the metal salt(s) is/are first added to the solvent(s), followed by the addition of the stabiliser(s) and the reducing agent(s). Alternatively, all ingredients can be added at the same time.

The accelerator solution according to the present invention can be used for curing and polymerisation initiation with several classes of peroxides. This is surprising, because until now the activation of peroxides other than hydroperoxides and ketone peroxides—such as peroxy dicarbonates—could not be achieved by metal complex accelerators at low temperatures.

Suitable peroxides to be used in combination with the accelerator solution of the invention are hydroperoxides, ketone peroxides, peresters, peroxy carbonates, perketals, diacyl peroxides, and peroxy dicarbonates.

It has also been found that, using a Co-containing accelerator according to the invention in combination with ketone peroxides, only a minor amount of Co—less than 0.01 wt % or even less than 0.001 wt %—is required to give a satisfactory curing reactivity.

The accelerator solution can also be used as paint dryer in coating compositions.

Curing

The invention further relates to a process for curing unsaturated polyester (UP) and acrylate resins. In such curing processes, it is common practice to first prepare the polyester or acrylate compound and, if desired, to combine this compound with an ethylenically unsaturated monomeric compound. Such mixtures are commercially available. The curing is generally started by adding the accelerator solution according to the invention and the initiator (peroxide) to the polyester or acrylate resin.

As a result of the storage stability of the accelerator solution of the present invention, it is also possible to pre-mix the resin and the accelerator solution days or weeks before the addition of the peroxide and, consequently, the start of the actual curing process. This allows commercial trade of a curable resin composition which already contains an accelerator and a reducing agent. The present invention therefore also relates to a composition comprising a curable unsaturated polyester or a curable acrylate resin and the accelerator solution according to the present invention.

When both the peroxide and the accelerator solution according to the invention have been added to the curable resin, the resulting mixture is mixed and dispersed. The curing process can be carried out at any temperature from −5° C. up to 250° C., depending on the initiator system, the accelerator system, the compounds to adapt the curing rate, and the resin composition to be cured. Preferably, it is carried out at ambient temperatures commonly used in applications such as hand lay-up, spray-up, filament winding, resin transfer moulding, coating (e.g. gelcoat and standard coatings), button production, centrifugal casting, corrugated sheets or flat panels, relining systems, kitchen sinks via pouring compounds, etc. However, it can also be used in SMC, BMC, pultrusion techniques, and the like, for which temperatures up to 180° C., more preferably up to 150° C., most preferably up to 100° C. are used.

UP resins include so-called ortho resins, iso-resins, iso-npg resins, vinyl ester resins, and dicyclopentadiene (DCPD) resins. Examples of such resins are maleic, fumaric, allylic, vinylic, and epoxy-type materials.

Acrylate resins include acrylates, methacrylates, diacrylates and dimethacrylates and oligomers thereof.

If desired, the UP resin or acrylate resin may be combined with one or more ethylenically unsaturated reactive monomers. Preferred ethylenically unsaturated reactive monomers include styrene and styrene derivatives such as α-methyl styrene, vinyl toluene, indene, divinyl benzene, vinyl pyrrolidone, vinyl siloxane, vinyl caprolactam, stilbene, but also diallyl phthalate, dibenzylidene acetone, allyl benzene, methyl methacrylate, methylacrylate, (meth)acrylic acid, diacrylates, dimethacrylates, acrylamides; vinyl acetate, triallyl cyanurate, triallyl isocyanurate, allyl compounds which are used for optical application (such as (di)ethylene glycol diallyl carbonate), and mixtures thereof.

The amount of ethylenically unsaturated monomer is preferably at least 0.1 wt %, based on the weight of the resin, more preferably at least 1 wt %, and most preferably at least 5 wt %. The amount of ethylenically unsaturated monomer is preferably not more than 50 wt %, more preferably not more than 40 wt %, and most preferably not more than 35 wt %.

In this curing process, the accelerator solution is generally employed in a conventional amount. Amounts of at least 0.01 wt %, preferably at least 0.1 wt %, and not more than 5 wt %, preferably not more than 2 wt % of the accelerator solution, based on the weight of the resin, are typically used.

Peroxides suitable for the curing of UP and acrylate resins include organic peroxides, such as conventionally used ketone peroxides, peresters, and peroxydicarbonates, but also peroxycarbonates, perketals, hydroperoxides and diacyl peroxides. The skilled person will understand that these peroxides can be combined with conventional additives, for instance phlegmatisers, such as hydrophilic esters and hydrocarbon solvents.

The amount of peroxide to be used in the curing process is preferably at least 0.1 wt %, more preferably at least 0.5 wt %, and most preferably at least 1 wt %. The amount of peroxide is preferably not more than 8 wt %, more preferably not more than 5 wt %, most preferably not more than 2 wt %, all based on the weight of the resin.

Other optional additives may be employed in the curing process according to the invention, such as fillers, glass fibres, pigments, inhibitors, and promoters.

In the curing process of the present invention, typically the resin is first mixed with the monomer. The accelerator composition can be added in several different manners and may have been pre-mixed with the monomer or resin. The peroxide formulation can be added directly to the mixture. However, it can also be first mixed with the monomer or resin. Care is to be taken that the peroxide formulation and the accelerator solution are not pre-mixed, since this would be hazardous.

Polymerisation Initiation

The accelerator solution according to the present invention can also be used to accelerate the polymerisation initiation in redox polymerisation processes.

Such polymerisation processes may be carried out in the usual manner, for example in bulk, suspension, emulsion, or solution.

The peroxide and the accelerator solution can be added at the start of the polymerisation process, or they can be dosed partly or in their entirety during the polymerisation process. It is also possible to add the peroxide at the start of the polymerisation process, while the accelerator solution is added during the said process, or vice versa.

The desired amounts of peroxide and accelerator solution vary depending on the polymerisation temperature, the capacity for removing the heat of polymerisation, the kind of monomer to be used, and the applied pressure. Usually, from 0.001-10 wt % peroxide, based on the weight of the (co)polymer, is employed. Preferably, from 0.001-5 wt % of peroxide is employed and most preferably from 0.001-2 wt %. The ratio of peroxide to metal salt preferably ranges from 0.2-100.

The polymerisation temperature usually is 5° to 300° C., preferably 10° to 180° C. In general, if it is below 5° C., the polymerisation time becomes too long. However, when it exceeds 300° C., the radical is spent in the initial stage of the polymerisation, making it difficult to attain a high conversion. In order to reduce the amount of unreacted monomer, however, it is also possible to conduct the polymerisation using a temperature profile, e.g., to perform the initial polymerisation at below 100° C. and then elevate the temperature above 100° C. to complete the polymerisation. These variations are all known to the man skilled in the art, who will have no difficulty selecting the reaction conditions of choice, depending on the particular polymerisation process and the specific radical polymerisation initiator to be used.

Suitable monomers for polymerisation using the accelerator solution according to the present invention are olefinic or ethylenically unsaturated monomers, for example substituted or unsubstituted vinyl aromatic monomers, including styrene, α-methyl styrene, p-methyl styrene, and halogenated styrenes; divinyl benzene; ethylene; ethylenically unsaturated carboxylic acids and derivatives thereof, such as (meth)acrylic acids, (meth)acrylic esters, such as 2-ethylhexyl acrylate, 2-ethylhexyl methacrylate, and glycidyl methacrylate; ethylenically unsaturated nitriles and amides, such as acrylonitrile, methacrylonitrile, and acrylamide; substituted or unsubstituted ethylenically unsaturated monomers, such as butadiene, isoprene, and chloroprene; vinyl esters, such as vinyl acetate and vinyl propionate; ethylenically unsaturated dicarboxylic acids and their derivatives including mono- and diesters, anhydrides, and imides, such as maleic anhydride, citraconic anhydride, citraconic acid, itaconic acid, nadic anhydride, maleic acid, fumaric acid, aryl, alkyl, and aralkyl citraconimides, maleimides, biscitraconimides, and bismaleimides; vinyl halides, such as vinyl chloride and vinylidene chloride; vinyl ethers, such as methyl vinyl ether and n-butyl vinyl ether; olefins, such as isobutene and 4-methyl pentene; allyl compounds, such as (di)allyl esters, for example diallyl phthalates, (di)allyl carbonates, and triallyl (iso)cyanurate.

During (co)polymerisation, the formulations may also contain the usual additives and fillers. As examples of such additives may be mentioned: inhibitors of oxidative, thermal, or ultraviolet degradation, lubricants, extender oils, pH controlling substances, such as calcium carbonate, release agents, colourants, reinforcing or non-reinforcing fillers such as silica, clay, chalk, carbon black, and fibrous materials, such as glass fibres, plasticisers, diluents, chain transfer agents, accelerators, and other types of peroxides. These additives may be employed in the usual amounts.

EXAMPLES

In the examples below, the following resins and peroxides were used:

| | |
|---|---|
| Palatal ® P6 | Ortho Phthalic Acid-based resin (OPA resin), ex DSM |
| Palatal ® P51 | Tetra Hydro Phthalic Acid-based resin (THPA), ex DSM |
| ENOVA.Atlac | Vinyl Ester-based resin (VE), ex DSM |
| Syn.6494-U2 | Di Cyclo Pentadiene-based resin (DCPD), ex DSM, |
| MA 123 M50 | MMA/Dimethacrylate resin, ex Akzo Nobel |
| Trigonox ® 21 | A commercial tert-butyl peroxy-2-ethyl hexanoate ex Akzo Nobel |
| Trigonox ® C | A commercial tert-butyl peroxybenzoate ex Akzo Nobel |
| Trigonox ® 117 | A commercial tert-butyl peroxy-2-ethyl-hexyl carbonate ex Akzo Nobel |
| Perkadox ® 16 | A commercial di(4-tert-butyl cyclohexyl) peroxy dicarbonate ex Akzo Nobel |
| Perkadox ® CH50 | A commercial benzoyl peroxide ex Akzo Nobel |

In the examples below, the curing of the unsaturated polyester resins was analysed by the method of the Society of Plastic Institute (analysis method F/77.1; available from Akzo Nobel Polymer Chemicals). This method involves measuring of the peak exotherm, the time to peak, and the gel time.

According to this method, 25 g of a mixture comprising 100 parts of polyester resin, 2 parts of peroxide, and 0.25 parts of accelerator solution were poured into a test tube and a thermocouple was placed through the enclosure at the centre of the tube. The glass tube was then placed in the oil bath maintained at a specific test temperature and the time-temperature curve was measured. From the curve the following parameters were calculated:

Gel time (Gt)=time in minutes elapsed between the start of the experiment and 5.6° C. above the bath temperature.

Time to peak exotherm (TTP)=time elapsed between the start of the experiment and the moment that the peak temperature is reached.

Peak exotherm (PE)=the maximum temperature which is reached.

Example 1

Accelerator solution A, according to the invention, was prepared by first mixing the solvent and the stabiliser at ambient temperature. Then the metal salt was added and the mixture was slowly heated to 80° C. At 80° C. the reducing agent was added and the total mixture was stirred for another 30 min at decreasing temperature. The composition of the resulting solution is shown in Table 1.

TABLE 1

| | | A (wt %) |
|---|---|---|
| solvent: | di-ethylene glycol | 84 |
| stabiliser: | nicotinamide | 0.25 |
| metal salt: | Cu(II) acetate | 0.20 |
| reducing agent: | D-iso ascorbic acid | 15.55 |

The storage stability of this composition was tested by curing Palatal® P6 resin with Trigonox® C at an initial temperature of 20° C., using the accelerator solutions direct after preparation and after storage for 2, 4, and 8 weeks at 20° or 40° C. Per 100 grams of resin, 2 grams of Trigonox® C and 0.25 gram accelerator solution were used in these tests. Table 2 indicates the gel time (Gt), Peak Exotherm (PE), and Time to Peak (TTP) measured.

TABLE 2

| Storage temperature (° C.) | Storage time (weeks) | Gt (min) | TTP (min) | PE (° C.) |
|---|---|---|---|---|
| | 0 | 6.2 | 15.4 | 167 |
| 20 | 2 | 6.8 | 17.3 | 164 |
| | 4 | 7.4 | 19.0 | 159 |
| | 8 | 7.2 | 17.6 | 160 |
| 40 | 2 | 7.4 | 18.8 | 160 |
| | 4 | 6.8 | 17.8 | 162 |
| | 8 | 6.9 | 17.3 | 161 |

Table 2 shows that after 8 weeks of storage, the accelerator solution showed no significant decrease in activity.

Example 2

The storage stability of a premix of a UP-resin with 1 wt % of accelerator A was measured on pre-gellation in the NOURY®-Potlifetimer by means of a metal ball which is moved upwards in a test tube by using a magnet. The lapse of time between the addition of the accelerator to the resin and the moment the metal ball cannot be moved anymore is called the pot life.

The results are shown in Table 3.

TABLE 3

| resin type | pot life (hrs) |
|---|---|
| Palatal ® P51 | 55 |
| ENOVA.Atlac | 90 |
| Syn.6494-U2 | 124 |
| MA 123 M50 | >148 |

Example 3

In this experiment, three accelerator solutions were used:
- accelerator solution A (see Table 1)
- accelerator solution B, which only differs from solution A in that it additionally contains 1 wt % of Cobalt(II) acetate
- a commercial Co-containing solution comprising an oxygen-containing solvent but no reducing agent (comparative solution C).

These solutions were tested for the curing of Palatal® P6 resin with Butanox® M50 at initial temperatures of 20° C. Per 100 grams of resin, 2 grams of peroxide were used in these tests. The amount of accelerator solution (per 100 grams resin) and the weight percentage of cobalt present in the curable composition are indicated in Table 4. This Table further shows the gel time (Gt) measured.

TABLE 4

| solution | amount used (gram) | wt % cobalt | Gt (min) |
|---|---|---|---|
| A | 0.35 | — | 6.8 |
| B | 0.35 | 0.00084 | 5.4 |
| C | 0.35 | 0.0137 | 5.8 |
| C | 0.021 | 0.00082 | 100 |

These results show that accelerator solutions according to the invention (solutions A and B) provide a satisfactory curing rate, which is comparable with that of a similar amount of a commercial solution.

The results further show that with the accelerator solutions according to the invention less cobalt is required to obtain desirable results than when using the commercial solution.

Example 4

Five different Cu-based accelerator solutions (D1-D5) were prepared (see Table 5; all in weight percentages) according to the procedure of Example 1. These solutions were tested for the curing of Palatal® P6 resin with Trigonox® 21 and Trigonox® 117 at initial temperatures of 20° C. Per 100 grams of resin, 2 grams of peroxide and 0.5 gram of accelerator solution were used in these tests. Table 6 indicates the gel time (Gt), time to peak (TTP), and peak exotherm (PE) measured.

TABLE 5

| | | D1 | D2 | D3 | D4 | D5 |
|---|---|---|---|---|---|---|
| solvent: | di-ethylene glycol | 70.0 | 75.0 | 80.0 | 70.0 | 70.0 |
| stabilisers: | monobutyl dihydrophosphite | 10.0 | 10.0 | — | 10.0 | 10.0 |
| | nicotinamide | 5.0 | 5.0 | 5.0 | 5.0 | 5.0 |
| | di-ethanolamine | 5.0 | | 5.0 | 3.0 | 3.0 |
| | di-ethyl acetoamide | — | — | — | 2.0 | 2.0 |
| metal salt: | Cu(II) acetate (2 H$_2$O) | 1.0 | 1.0 | 1.0 | 1.0 | 1.0 |
| | Vanadium pentoxide | — | — | — | — | 0.2 |
| reducing agent: | D-iso ascorbic acid | 9.0 | 9.0 | 9.0 | 9.0 | 9.0 |

TABLE 6

| Accelerator solution | peroxide | Gt (min) | TTP (min) | PE (° C.) |
|---|---|---|---|---|
| D1 | Trigonox ® 21 | 4.6 | 7.5 | 188 |
| D2 | Trigonox ® 21 | 5.5 | 11.6 | 184 |
| D3 | Trigonox ® 21 | 2.9 | 5.4 | 189 |
| D4 | Trigonox ® 21 | 4.7 | 7.5 | 192 |
| D5 | Trigonox ® 21 | 4.8 | 5.2 | 191 |
| D1 | Trigonox ® 117 | 7.4 | 12.4 | 154 |
| D2 | Trigonox ® 117 | 14.7 | 21.0 | 180 |
| D3 | Trigonox ® 117 | 4.9 | 8.6 | 173 |
| D4 | Trigonox ® 117 | 8.1 | 11.4 | 188 |
| D5 | Trigonox ® 117 | 4.9 | 7.4 | 187 |

This table shows that the accelerator solutions according to the invention result in good curing performances of both peresters and peroxy carbonates.

Example 5

Five different Fe-based accelerator solutions (D6-D10) were prepared (see Table 7, all in weight percentages) according to the procedure of Example 1. These solutions were tested for the curing of Palatal P6 resin with Trigonox® 21 and Trigonox® 117 at initial temperatures of 20° C. Per 100 grams of resin, 2 grams of peroxide and 1 gram accelerator solution were used in these tests. Table 8 indicates the gel time (Gt), time to peak (TTP), and peak exotherm (PE) measured.

TABLE 7

| | | D6 | D7 | D8 | D9 | D10 |
|---|---|---|---|---|---|---|
| solvent: | ethylene glycol | 79.0 | 78.0 | 78.5 | 77.9 | 81.6 |
| stabilisers: | monobutyl dihydrophosphite | — | 1 | — | — | — |
| | nicotinamide | — | — | — | 1 | 1 |
| | di-ethanolamine | — | — | 0.5 | — | 0.3 |
| metal salt: | Cu(II) acetate (2 H$_2$O) | — | — | — | 0.1 | 0.1 |
| | Fe(II) sulphate (6 H$_2$O) | 2.0 | 2.0 | 2.0 | 2.0 | 2.0 |
| reducing agent: | D-iso ascorbic acid | 19.0 | 19.0 | 19.0 | 19.0 | 15.0 |

TABLE 8

| Accelerator solution | peroxide | Gt (min) | TTP (min) | PE (° C.) |
|---|---|---|---|---|
| D6 | Trigonox ® 21 | 12.3 | 32.1 | 145 |
| D7 | Trigonox ® 21 | 18.9 | 44.4 | 139 |
| D8 | Trigonox ® 21 | 9.6 | 23.4 | 163 |
| D9 | Trigonox ® 21 | 4.9 | 7.3 | 190 |
| D10 | Trigonox ® 21 | 4.9 | 7.2 | 194 |
| D6 | Trigonox ® 117 | 10.5 | 29.4 | 140 |
| D7 | Trigonox ® 117 | 17.9 | 44.0 | 121 |
| D8 | Trigonox ® 117 | 8.2 | 20.9 | 163 |
| D9 | Trigonox ® 117 | 6.0 | 8.4 | 193 |
| D10 | Trigonox ® 117 | 5.8 | 8.0 | 195 |

This table shows that the accelerator solutions according to the invention result in good curing performances of both peresters and peroxy carbonates.

Example 6

Accelerator solution A (see Table 1) was tested for the curing of Palatal P6 resin with Perkadox® 16 at an initial temperature of 20° C. Per 100 grams of resin, 2 grams of peroxide and 0.25 gram accelerator solution A were used. The gel time of this system was 2.5 minutes, the time to peak 7.8 min, and the peak exotherm 170° C.

Hence, the solution according to the invention is even suitable for accelerating peroxy dicabonates.

Example 7

Accelerator solution A (see Table 1) was tested for the curing of Palatal P6 resin with Perkadox® CH50 at an initial temperature of 20° C. Per 100 grams of resin, 2 grams of peroxide and 0.25 gram accelerator solution A were used. The gel time of this system was 6.2 minutes, the time to peak 17.3 min, and the peak exotherm 161° C.

Hence, the solution according to the invention is also suitable for accelerating diacyl peroxides.

Example 8

Accelerator solution A (see Table 1) was tested for the curing of acrylate resin MA123 M-50 resin with Trigonox® C and Perkadox® 16 at an initial temperature of 20° C. Per 100 grams of resin, 2 grams of peroxide were used in these tests. The amount of accelerator solution (per 100 grams resin) is indicated in Table 9. The results are shown in Table 9.

TABLE 9

| peroxide | Acc. Sol. A (g/100 g resin) | Gt (min) | TTP (min) | PE (° C.) |
|---|---|---|---|---|
| Trigonox ® C | 0.5 | 7.5 | 26 | 99 |
| Perkadox ® 16 | 0.25 | 2.2 | 22.4 | 141 |

These results show that the accelerator solution according to the invention is also suitable for use in acrylate curing.

Example 9

Two different Cu-based accelerator solutions (D11-D12) were prepared (see Table 10; all in weight percentages) according to the procedure of Example 1. These solutions were tested for the curing of Palatal® P6 resin with Perkadox® CH50 at initial temperatures of 20° C. Per 100 grams of resin, 3 grams of peroxide and 2.2 gram of accelerator solution were used in these tests. Table 11 indicates the gel time (Gt), time to peak (TTP), and peak exotherm (PE) measured.

TABLE 10

|  |  | D11 | D12 |
|---|---|---|---|
| solvents: | di-ethylene glycol | 32.0 | 32.4 |
|  | 1-methyl-2-pyrrolidinone | 18.0 | 18.2 |
|  | water | 36.0 | 36.4 |
| stabiliser: | di-ethanolamine | 1.3 | 1.4 |
| metal salt: | Cu(II) acetate (2 H$_2$O) | 0.4 | 0.6 |
| reducing agent: | D-iso ascorbic acid | 12.3 |  |
|  | Sodium formaldehyde sulphoxylate |  | 11 |

TABLE 11

| Accelerator solution | peroxide | Gt (min) | TTP (min) | PE (° C.) |
|---|---|---|---|---|
| D11 | Perkadox ® CH50 | 8.8 | 11 | 161 |
| D12 | Perkadox ® CH50 | 3 | 21.2 | 78 |

This table shows that sodium formaldehyde sulphoxylate and ascorbic acid are both suitable as reducing agent.

The invention claimed is:

1. A redox system comprising a first solution comprising a peroxide and a second accelerator solution, wherein the accelerator solution consists essentially of:
    a) more than 1.0 wt %, based on the total weight of the accelerator solution, of one or more reducing agents, at least one of them being selected from the group consisting of ascorbic acid and sodium formaldehyde sulphoxylate,
    b) one or more metal salts, at least one of them being selected from the group consisting of transition metal salts, lithium salts, and magnesium salts,
    c) one or more organic oxygen-containing solvents,
    d) optionally one or more stabilisers, and
    e) optionally water.

2. The redox system according to claim 1 wherein the solvent is selected from the group consisting of ethylene glycol, di-ethylene glycol, polyethylene glycol, triethyl phosphate, dibutyl phosphate, N-methyl pyrrolidone, butyl acetate, ethyl acetate, and mixtures thereof.

3. The redox system according to claim 1 wherein the stabiliser is selected from the group consisting of di-ethanol amine, nicotinamide, alkali metal 2-ethyl hexanoates, diethyl acetoacetamide, itaconic acid, diethyl amine, monobutyl dihydrophosphite, and mixtures thereof.

4. The redox system according to claim 1 wherein the metal salts are selected from the group consisting of copper salts, cobalt salts, iron salts, vanadium salts, and combinations thereof.

5. The redox system according to claim 4 wherein the metal salt is selected from the group consisting of Cu(II) acetate, Cu(II) sulphate, Cu(II) 2-ethyl hexanoate, Co(II) acetate, Fe(II) sulphate, Fe(III) chloride, V(II) 2-ethyl hexanoate, and combinations thereof.

6. The redox system according to claim 1 wherein the accelerator solution consists essentially of:
    a) 2-30 wt % of the one or more reducing agents,
    b) 0.01-10 wt % of the one or more metal salts,
    c) 50-95 wt % of the one or more organic oxygen-containing solvents,
    d) 0-20 wt % of the one or more stabilisers, and
    e) e) 0-10 wt % water.

7. The redox system according to claim 1, wherein the solvent is selected from the group consisting of ethylene glycol, di-ethylene glycol, polyethylene glycol, triethyl phosphate, dibutyl phosphate, N-methyl pyrrolidone, butyl acetate, ethyl acetate, and mixtures thereof, and wherein the stabiliser is present and is selected from the group consisting of di-ethanol amine, nicotinamide, alkali metal 2-ethyl hexanoates, diethyl acetoacetamide, itaconic acid, diethyl amine, monobutyl dihydrophosphite, and mixtures thereof.

8. The redox system according to claim 1, wherein the solvent is selected from the group consisting of ethylene glycol, di-ethylene glycol, polyethylene glycol, triethyl phosphate, dibutyl phosphate, N-methyl pyrrolidone, butyl acetate, ethyl acetate, and mixtures thereof, and wherein the metal salts are selected from the group consisting of copper salts, cobalt salts, iron salts, vanadium salts, and combinations thereof.

9. The redox system according to claim 1, wherein the stabiliser is present and is selected from the group consisting of di-ethanol amine, nicotinamide, alkali metal 2-ethyl hexanoates, diethyl acetoacetamide, itaconic acid, diethyl amine, monobutyl dihydrophosphite, and mixtures thereof, and wherein the metal salts are selected from the group consisting of copper salts, cobalt salts, iron salts, vanadium salts, and combinations thereof.

10. The redox system according to claim 1, wherein the solvent is selected from the group consisting of ethylene glycol, di-ethylene glycol, polyethylene glycol, triethyl phosphate, dibutyl phosphate, N-methyl pyrrolidone, butyl acetate, ethyl acetate, and mixtures thereof, wherein the stabiliser is present and is selected from the group consisting of di-ethanol amine, nicotinamide, alkali metal 2-ethyl hexanoates, diethyl acetoacetamide, itaconic acid, diethyl amine, monobutyl dihydrophosphite, and mixtures thereof, and wherein the metal salt is selected from the group consisting of Cu(II) acetate, Cu(II) sulphate, Cu(II) 2-ethyl hexanoate, Co(II) acetate, Fe(II) sulphate, Fe(III) chloride, V(II) 2-ethyl hexanoate, and combinations thereof.

11. The redox system according to claim 9 wherein the metal salt is selected from the group consisting of Cu(II) acetate, Cu(II) sulphate, Cu(II) 2-ethyl hexanoate, Co(II) acetate, Fe(II) sulphate, Fe(III) chloride, V(II) 2-ethyl hexanoate, and combinations thereof.

12. The redox system according to claim 1, wherein the accelerator solution consists essentially of:
   a) 2-30 wt % of the one or more reducing agents,
   b) 0.01-10 wt % of the one or more metal salts,
   c) 50-95 wt % of the one or more organic oxygen-containing solvents,
   d) 0-20 wt % of the one or more stabilisers, and
   e) 0-10 wt % water, and
   wherein the solvent is selected from the group consisting of ethylene glycol, di-ethylene glycol, polyethylene glycol, triethyl phosphate, dibutyl phosphate, N-methyl pyrrolidone, butyl acetate, ethyl acetate, and mixtures thereof, wherein the stabiliser is present and is selected from the group consisting of di-ethanol amine, nicotinamide, alkali metal 2-ethyl hexanoates, diethyl acetoacetamide, itaconic acid, diethyl amine, monobutyl dihydrophosphite, and mixtures thereof, and wherein the metal salt is selected from the group consisting of Cu(II) acetate, Cu(II) sulphate, Cu(II) 2-ethyl hexanoate, Co(II) acetate, Fe(II) sulphate, Fe(III) chloride, V(II) 2-ethyl hexanoate, and combinations thereof.

13. The redox system according to claim 1, the accelerator solution consists essentially of:
   a) 2-30 wt % of the one or more reducing agents,
   b) 0.01-10 wt % of the one or more metal salts,
   c) 50-95 wt % of the one or more organic oxygen-containing solvents,
   d) 0-20 wt % of the one or more stabilisers, and
   e) 0-10 wt % water, and
   wherein the stabiliser is present and is selected from the group consisting of di-ethanol amine, nicotinamide, alkali metal 2-ethyl hexanoates, diethyl acetoacetamide, itaconic acid, diethyl amine, monobutyl dihydrophosphite, and mixtures thereof, and wherein the metal salt is selected from the group consisting of Cu(II) acetate, Cu(II) sulphate, Cu(II) 2-ethyl hexanoate, Co(II) acetate, Fe(II) sulphate, Fe(III) chloride, V(II) 2-ethyl hexanoate, and combinations thereof.

14. An accelerator solution suitable for forming a redox system with peroxides, consisting essentially of:
   a) more than 1.0 wt %, based on the total weight of the accelerator solution, of one or more reducing agents, at least one of them being selected from the group consisting of ascorbic acid and sodium formaldehyde sulphoxylate,
   b) one or more metal salts, at least one of them being selected from the group consisting of transition metal salts, lithium salts, and magnesium salts,
   c) one or more organic oxygen-containing solvents selected from the group consisting of ethylene glycol, di-ethylene glycol, polyethylene glycol, triethyl phosphate, dibutyl phosphate, N-methyl pyrrolidone, butyl acetate, ethyl acetate, and mixtures thereof,
   d) one or more stabilisers selected from the group consisting of di-ethanol amine, nicotinamide, alkali metal 2-ethyl hexanoates, diethyl acetoacetamide, itaconic acid, diethyl amine, monobutyl dihydrophosphite, and mixtures thereof, and
   e) optionally water.

15. The accelerator solution according to claim 14, wherein the reducing agent is present in an amount from 5 to 20 wt %, the metal salt is present in an amount from 0.1 to 2 wt %, and the solvent is present in an amount of at least 50 wt %, all based on the accelerator solution.

16. The accelerator solution according to claim 15, wherein the stabiliser is present in an amount from 0.1 to 10 wt %, based on the accelerator solution.

17. The accelerator solution according to claim 16, wherein the accelerator solution has a storage stability of at least 8 weeks.

* * * * *